March 12, 1963 S. ROSIN ETAL 3,080,789
FLOW CELLS
Filed July 1, 1960
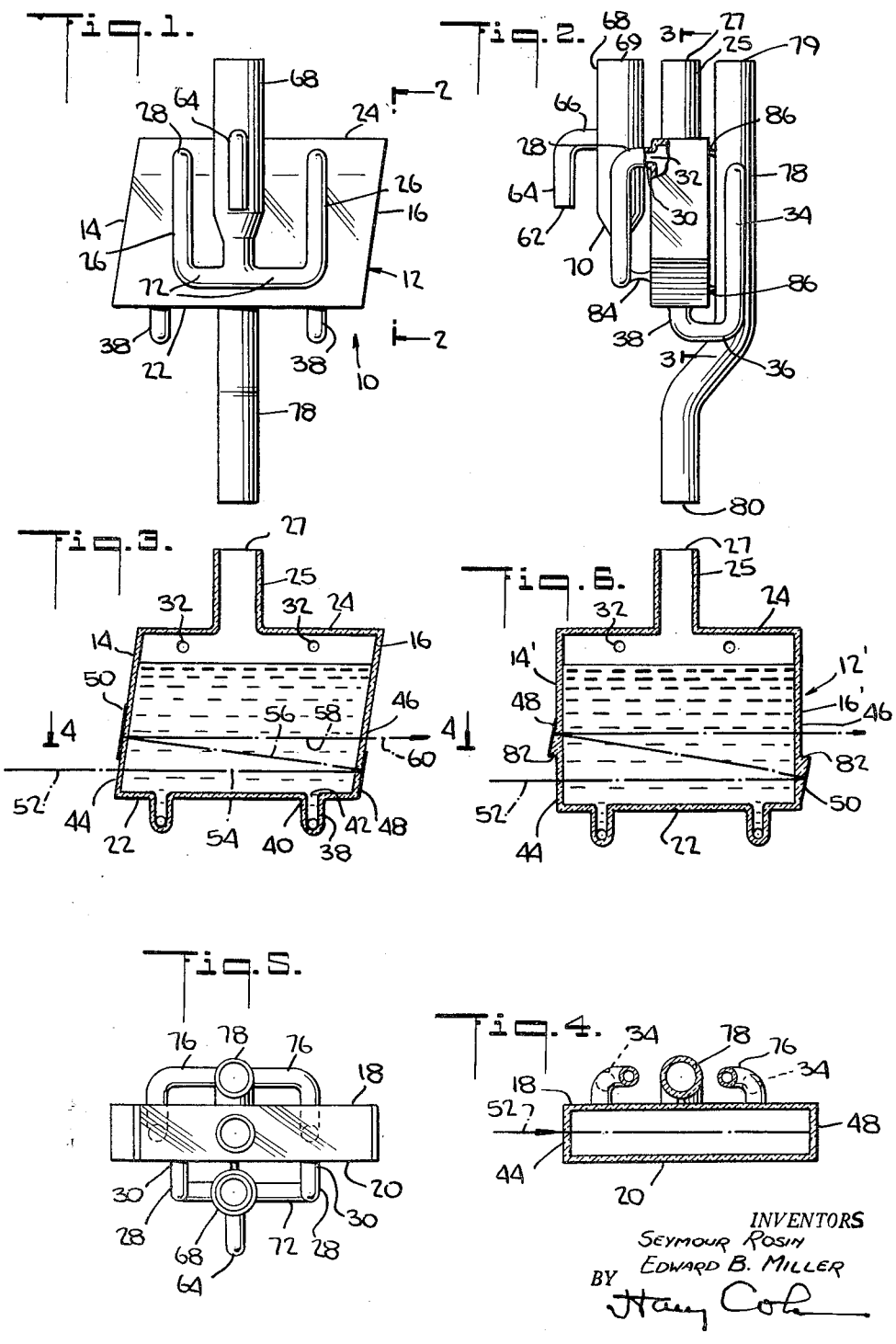
INVENTORS
SEYMOUR ROSIN
EDWARD B. MILLER
BY
ATTORNEY United States Patent Office 3,080,789
Patented Mar. 12, 1963

3,080,789
FLOW CELLS
Seymour Rosin, Massapequa Park, and Edward B. Miller, Pleasantville, N.Y., assignors to Technicon Instruments Corporation, Chauncey, N.Y., a corporation of New York
Filed July 1, 1960, Ser. No. 40,334
3 Claims. (Cl. 88—14)

This invention relates to flow cells for colorimeters which are provided with a source of light and a photoelectric device or other measuring means for viewing a stream of liquid as it flows through the flow cell, for analysis, processing, monitoring, etc. with respect to a constituent of the liquid stream.

A primary object of the present invention is to provide an improved flow cell which has a comparatively long optical path, for the light which passes through the liquid from the light source to the means which measures the light absorptive quality of the liquid, whereby to increase the sensitivity of response of the measuring means to the light transmitted thereto through the liquid, and to accomplish this result with a flow cell of small volume. In other words, pursuant to this object of the invention, liquid specimens of small volume and low concentration in respect to the ingredient under analysis can be more effectively examined by reason of the increase of the optical path without increase of the length of the liquid-flow path in the cell. Further, pursuant to this invention, a decrease in the length of the flow path of the liquid in the cell is accomplished without decrease in the sensitivity of response of the measuring means and this is advantageous not only because specimens of small volume or low concentration can be analyzed more accurately but also because the decrease in the path of liquid flow eliminates or reduces to a tolerable limit the contamination of one specimen by a preceding specimen in a stream of specimens transmitted through the flow cell in a continuous analysis process, for example, such as that described in U.S. Patent No. 2,797,149. The decrease in the length of the flow path of the liquid in the cell reduces the possibility of contamination more especially because the time required for a particular specimen to pass through the cell is thereby decreased and concomitantly there is insufficient time for any constituent of the liquid to adhere to the walls of the cell and contaminate a following specimen. It will be appreciated that this decrease in the length of the flow path of the liquid in the cell without decrease in sensitivity of response is accomplished by an effective and efficient lengthening of the light path through the liquid in the cell, in accordance with this invention.

Another object of the present invention is the provision of a flow cell which provides a relatively long path of travel for the light rays through the liquid in the flow cell while providing a relatively short path of flow of the liquid stream through the flow cell, the path of flow of the stream being substantially transversely of the path of the light rays through the flow cell.

Another object is the provision of a flow cell having a liquid receiving chamber whose end walls have transparent portions and light reflective portions which are flat and are at an angle oblique to the direction of the light passing into and out of the transparent portions, respectively, of the end walls of the liquid receiving chamber.

A further object is a provision of a flow cell having liquid inlets and liquid outlets which are arranged to direct the passage of the liquid stream through the flow cell in such a manner as to minimize the effect of interfering substances which may be present in the liquid and to minimize the turbulence of the stream during its passage through the flow cell.

Another object is the provision of a flow cell whose configuration enables the liquid stream to flow through the liquid receiving chamber of the flow cell in such a manner as to substantially reduce or eliminate the adherence of any particles, contaminants or other interfering substances in the stream to the walls of the liquid receiving chamber.

Another object is the provision of a flow cell having improved means for distributing the liquid to the flow cell to improve the flow characteristics of the liquid in the cell.

The above and other objects, features and advantages of the invention will be more fully understood from the following description considered in connection with the accompanying illustrative drawings.

In the drawings which illustrate the best modes presently contemplated of carrying out the invention:

FIG. 1 is a side elevational view of a flow cell in accordance with the invention;

FIG. 2 is an end elevational view of the flow cell, looking in the direction of arrows 2 of FIG. 1, with a portion broken away for illustrative purposes;

FIG. 3 is a vertical sectional view taken on line 3—3 of FIG. 2;

FIG. 4 is a horizontal sectional view taken on line 4—4 of FIG. 3;

FIG. 5 is a top plan view of the flow cell; and

FIG. 6 is a vertical sectional view, similar to FIG. 3, showing a modification of a part of the flow cell.

Referring to the drawings in detail, the continuous flow cell or flow cuvette 10, which is preferably made of a suitable glass, for example one sold under the trademark "Pyrex," comprises a liquid receiving chamber 12 which has a pair of parallel spaced inclined end walls 14 and 16, respectively, spaced vertical side walls 18 and 20, respectively, a horizontal bottom wall 22 and a horizontal top wall 24. The inner surfaces of the walls are flat. The horizontal top wall is provided with a vertical vent tube 25 which has a vent opening 27 at the upper end thereof. A pair of vertical inlet tubes 26 is provided which are horizontally spaced from each other and are also spaced horizontally from side wall 20 of the liquid receiving chamber. Each of the vertical inlet tubes has, at the upper end thereof, a horizontal tubular portion 28 whose end 30 is integral with the upper portion of side wall 20 and forms an inlet opening 32 at the upper portion of the liquid receiving chamber 12. A pair of horizontally spaced vertical outlet tubes 34 is provided which are spaced horizontally from side wall 18 of the liquid receiving chamber 12. Each of the outlet tubes is provided with a horizontal tubular portion 36 at the lower end thereof and a vertical tubular portion 38 whose end 40 is in integral relation with bottom wall 22 of the liquid receiving chamber 12 and forms an outlet opening 42 in the bottom wall of the chamber. It will be noted that inlet openings 32 in the chamber 12 are substantially in vertical alignment with outlet openings 42, respectively, of the chamber so that liquid entering the chamber through opening 32 flows substantially in a vertically downward direction toward the corresponding outlet opening 42 through which the liquid leaves the chamber. In this manner, turbulence due to the flow of the liquid through the liquid receiving chamber 12 is kept to a minimum because of the relatively short path of flow of the liquid through the chamber and the elimination of the necessity of the liquid to flow horizontally to fill the chamber or to flow to an outlet which is horizontally displaced from the inlet of the chamber. In addition, because of the substantially vertical flow of the liquid through the chamber, any contaminants, particles, or other interfering substances in the liquid have little or no opportunity to adhere to the sides or bottom of the chamber during the course of the flow of the liquid, as is often the case if the flow is substantially horizontal. The form of liquid receiving chamber 12 also aids in the elimination of any entrapment in the chamber of contaminants which may be present in the liquid and which may have a tendency to settle out as the liquid flows through the chamber. Further, the relatively short vertical path of flow of the liquid minimizes the effect of interfering substances present in the liquid on the light transmittance characteristics of the liquid because of the relatively short time the interfering substances are present in the liquid receiving chamber.

Referring now to FIG. 3, it will be seen that end wall 14 is provided with a light transparent portion 44 and end wall 16 is also provided with a light transparent portion 46, said light transparent portions providing apertures through which the light is transmitted. It will be understood that the flow cell is preferably made entirely of glass, as previously mentioned, so that end walls 14 and 16 are normally transparent. The portion of end wall 16 which is directly opposite and in registry with transparent portion 44 of end wall 14 is provided with a light reflective coating 48 on the outer surface thereof to provide a light reflector integral with end wall 16. Similarly, a light reflective coating 50 is provided on the outer surface of end wall 14 directly opposite and in registry with light transparent portion 46 of end wall 16 to provide a light reflector integral with end wall 14. Thus it is seen that a pair of light reflectors 48, 50 is provided which have flat or plane reflecting surfaces integral with the end walls, respectively, of the liquid receiving chamber 12 and are horizontally and vertically spaced from each other, are parallel to each other, and extend in oblique or inclined planes constituted by end walls 14 and 16, said end walls being parallel to each other. The light reflective coatings 48 and 50 may be provided by a film of aluminum or any other suitable reflective material overlaid with a protective coating of silicon oxide or silicon dioxide.

A horizontal light beam 52, from a suitable source not shown in the colorimeter, enters liquid receiving chamber 12 through light transparent portion 44 and travels along a substantially horizontal path 54 through the liquid in the chamber and is directed onto reflector 48. From reflector 48, the light beam is reflected back along a path 56 through the liquid and is directed onto reflector 50 which reflects the light beam back again through the liquid, along a substantially horizontal path 58, through light transparent portion 46, and the light beam leaves chamber 12 along a light path 60. It will be understood that the light beam is also refracted during its passage through the walls of the chamber 12 but the effect of such refraction is to bend the light beam only slightly from what is shown. It is to be understood that a suitable photo-electric device is placed in the light path 60 of the light beam and measures the amount of light passing through the liquid in the chamber 12 of the flow cell.

As is well known in colorimetry, the amount of light absorbed by the liquid in the chamber 12 of the flow cell is an indication of the quantity of a particular ingredient present in the liquid undergoing colorimetric analysis. Thus, it is seen that during the passage of the liquid vertically through the liquid receiving chamber 12, from the top to the bottom thereof via inlets 32 and outlets 42, light beam 52 traverses the liquid along light paths 54, 56 and 58, so that the length of the light path has been multiplied without a commensurate increase in the quantity of liquid passing through the flow cell. It will be apparent that in examining liquids with respect to ingredients present in minute quantities, the increase in the length of the light path without a commensurate increase in the quantity of the fluid, automatically multiplies the quantity of the ingredient present and thereby provides greater sensitivity and accuracy in the colorimetric determination of the quantity of the ingredient.

The fluid stream enters the flow cell 10 through the open inlet end 62 at the bottom of vertical tube 64 which is adapted to be connected to a conduit through which the fluid stream flows. Tube 64 has a horizontal tubular portion 66 which is connected to a vertical vent tube 68 which has a vent opening 69 at its upper end. If the fluid stream consists of a series of liquid segments separated by intervening segments of gas, the gas segments would separate from the liquid segments in vent tube 68 and be vented to the atmosphere through the opening 69 in the vent tube. The liquid segments flow down the vent tube and collect at the necked down portion 70 thereof, at the bottom of the vent tube, to form a consolidated and continuous liquid stream. From necked down portion 70, the liquid stream divides into two separate liquid streams and flows through horizontal tubular members 72, respectively, which are connected to the previously mentioned vertical inlet tubes 26, respectively. The separate streams flow upwardly through inlet tubes 26, respectively, and enter the liquid receiving chamber 12 through inlet openings 32, respectively, as previously described. The liquid flows downwardly through the chamber 12 across the light paths 54, 56 and 58 and leaves the chamber through outlets 42, respectively, as separate liquid streams, as previously described. From outlets 42, the liquid streams flow vertically upwardly through their respective vertical outlet tubes 34, each of which has a horizontal tubular portion 76 connected thereto. The position of tubular portions 76 determines the height of the liquid in the liquid receiving chamber 12. Tubular portions 76 are connected to a vertically extending tube 78 which is open at its top 79 for venting purposes. The lower end 80 of tube 78 is open and provides an outlet for the liquid in the flow cell. It will be noted that the separate streams flowing through their respective horizontal tubular portions 76 enter tube 78 and flow downwardly as a single consolidated stream to the outlet end 80 of the flow cell. It will be apparent that vent openings 69, 27 and 79 maintain equal hydrostatic pressures through the various parts of the flow cell. Reinforcing ribs 84 and 86 help fix the relative positions of the parts of the flow cell and strengthen the flow cell structurally.

Referring now to FIG. 6, there is shown another embodiment of the invention which is similar in all respects to the flow cell just described with the exception of the liquid receiving chamber 12. The liquid receiving chamber 12' of the flow cell shown in FIG. 6 has rectangular side walls instead of the rhomboid side walls 18 and 20 of chamber 12 so that end walls 14' and 16' are vertical instead of inclined. Each of the end walls 14' and 16' has a thickened portion 82 whose outer surface is flat and inclined at an angle which is the same as the oblique angle of the end walls 14 and 16 of liquid receiving chamber 12. The outer inclined flat surfaces of thickened portions 82 are provided with light reflective coatings 48 and 50, respectively, in the exact same manner as the end wall reflector portions of liquid receiving chamber 12. In all other respects liquid receiving chambers 12 and 12' are identical. It will be apparent that light beam 52 will travel through liquid receiving chamber 12' and be reflected during its travel in the same manner as was previously described with respect to liquid receiving chamber 12. While we have shown two light reflective portions 48, 50 for the liquid receiving chamber, it will be understood that the chamber may be provided with additional light reflective portions to further increase the length of the optical path of the light through the liquid in the chamber. Further, while two inlets 32 and two outlets 42 are shown for the liquid receiving chamber it will be understood that only a single inlet may be provided located preferably midway between the end walls of the chamber and a single outlet may be provided at the bottom of the chamber substantially in vertical alignment with the inlet.

While we have shown and described the preferred embodiments of our invention it will be understood that various changes may be made in the present invention without departing from the underlying idea or principles of the invention within the scope of the appended claims.

What is claimed is:

1. A flow cell for measuring the light transmission characteristics of a liquid during its flow through the cell, for analysis of the liquid in respect to an ingredient thereof, said flow cell comprising:
    (a) a pair of confronting end wall spaced from each other in the direction of the light path,
    (b) each of said end walls having at least a portion thereof made of light transmitting material, and
    (c) liquid inlet means and liquid outlet means relatively positioned so that said liquid flows through said cell between said end walls,
    (d) each of said portions of said end walls providing a part for transmitting light therethrough and providing another part, disposed laterally of said light transmitting part,
    (e) said other part having a thickness which is greater than the thickness of the adjacent portions of the end wall and having a coating of light reflecting material on its outer surface to provide a light reflecting part,
    (f) said light reflecting part of each wall being positioned with respect to the opposite end wall to receive light passing through the liquid from said opposite wall and to reflect said light back through the liquid to said opposite wall.

2. A flow cell for measuring the light transmission characteristics of a liquid during its flow through the cell, for analysis of the liquid in respect to an ingredient thereof, said flow cell comprising:
    (a) a pair of confronting vertical end walls having flat inner surfaces spaced from each other in the direction of the light path,
    (b) each of said end walls having at least a portion thereof made of light transmitting material,
    (c) liquid inlet means having an outlet opening positioned relative to said end walls for the flow of the liquid downwardly between said end walls, and
    (d) liquid outlet means having an inlet opening positioned relative to said end walls and below said outlet opening for transmitting said liquid from said cell,
    (e) each of said portions of said end walls providing a part for transmitting light therethrough and providing another part, vertically spaced from said light transmitting part,
    (f) said other parts each having a thickness which is greater than the thickness of the adjacent portions of the corresponding end wall and having an outer surface which is at an oblique angle to said corresponding end wall,
    (g) said outer surfaces each having a coating of light reflecting material to provide a light reflecting part,
    (h) said light reflecting part of each wall being in registry with the light transmitting part of the opposite wall to receive light passing through the liquid from said opposite wall and to reflect said light back through the liquid to said opposite wall.

3. A flow cell for measuring the light transmission characteristics of a liquid during its flow through the cell, for analysis of the liquid in respect to an ingredient thereof, said flow cell comprising:
    (a) a pair of confronting parallel end walls having flat inner surfaces spaced from each other in the direction of the light path,
    (b) said end walls being at an oblique angle to the vertical,
    (c) each of said end walls having at least a portion thereof made of light transmitting material,
    (d) liquid inlet means having an outlet opening positioned relative to said end walls for the flow of the liquid downwardly between said end walls, and
    (e) liquid outlet means having an inlet opening positioned relative to said end walls and below said outlet opening for transmitting said liquid from said cell,
    (f) each of said portions of said end walls providing a part for transmitting light therethrough and providing another part, vertically spaced from said light transmitting part,
    (g) said other parts each having a flat outer surface provided with a coating of light reflecting material to provide a light reflecting part,
    (h) said light reflecting part of each wall being in registry with the light transmitting part of the opposite wall to receive light passing through the liquid from said opposite wall and to reflect said light back through the liquid to said opposite wall.

References Cited in the file of this patent

UNITED STATES PATENTS

| 1,691,138 | Schmick | Nov. 13, 1928 |
| 2,245,124 | Bonn | June 10, 1941 |
| 2,407,838 | Kliever | Sept. 17, 1946 |
| 2,412,602 | Chambers et al. | Dec. 17, 1946 |
| 2,535,181 | Way | Dec. 26, 1950 |
| 2,649,011 | Black | Aug. 18, 1953 |

FOREIGN PATENTS

| 168,298 | Switzerland | Aug. 1, 1934 |
| 584,506 | Great Britain | Jan. 16, 1947 |

OTHER REFERENCES

Fastie et al.: "Selective Infra-Red Gas Analyzers," Journal of the Optical Society of America, vol. 37, No. 10, October 1947, pages 764, 765 relied upon.

Gerlovich et al.: "Enhancement of the Sensitivity of the Optic-Acoustic Method of Gas Analysis by Using Cells With Multiple Passage of Radiation." Optics and Spectroscopy, vol. 7, No. 1, July 1959, page 63.